Patented Jan. 25, 1938

2,106,347

UNITED STATES PATENT OFFICE 2,106,347

PRODUCTION OF CARBONYLIC COMPOUNDS

Herbert P. A. Groll, Oakland, and George Hearne, Berkeley, Calif., assignors to Shell Development Company, San Francisco, Calif., a corporation of Delaware No Drawing. Application July 13, 1934, Serial No. 734,992

19 Claims. (Cl. 260—138)

This invention relates to a novel process for the production of valuable carbonylic compounds which comprises treating the ethers, esters and mixed ether-esters of polyhydric alcohols with water in the presence of an acid or acid-acting compound.

The compounds which may be readily converted to carbonylic compounds by our method may be regarded as polyhydric alcohols wherein one or a plurality of carbinol groups have been etherified or esterified. A suitable compound will possess at least one ethereal oxygen atom or ester group, and may or may not contain a carbinol group or groups. The ether and ester groups may be of cyclic, non-cyclic or mixed cyclic and non-cyclic character, that is a suitable ether and/or ester may contain a cyclic as well as non-cyclic ether or ester group.

It is to be understood that although the contemplated compounds may be considered as derivatives of true polyhydric alcohols, said contemplated compounds need not be capable of preparation by direct etherification and/or esterification of polyhydric alcohols. A suitable compound will, however, be capable of being intermediately converted to a true polyhydric alcohol on treatment with water under acid conditions as hereinafter specified. The contemplated ether and/or ester will be hydrolyzed and/or hydrated whereby it is split at the ether-oxygen and/or ester bond or bonds resulting in, or being capable of resulting in, the formation of a polyhydric alcohol. Under the conditions at which our invention is preferably executed, the intermediately formed polyhydric alcohol is unstable and consequently it is converted to its corresponding carbonylic compound substantially as soon as it is formed. The polyhydric alcohol may or may not be capable of isolation depending on its relative stability and on the conditions of execution of the process. The primary object of our invention is the preparation of carbonylic compounds, consequently we are not concerned with the isolation and/or relative stability of the polyhydric alcohol, nor do we postulate its existence per se in the reaction mixture.

The ethers and/or esters which we prefer to treat by our method are those wherein a carbon atom is linked to only one ethereal oxygen atom, ester group or radical, or hydroxyl group. For example, we do not prefer to treat compounds such as ethylidine diethyl ether.

The contemplated ethers and/or esters may, for purposes of convenience, be classified into several groups. The first group consists of open chain ethers and/or esters such as $CH_2OH-CH_2-O-CH_3$, $CH_3-O-CH_2-CH_2-O-CH_3$, $CH_2OH-CH_2-OOCCH_3$, $CH_3-O-CH_2-CH_2-OOCCH_3$, $CH_3COO-CH_2-CH_2-OOCCH_3$, $CH_3-O-CH_2-CH_2-O-C_2H_5$, $CH_2OH-CH-CH_2-O-CH_3$,
$\qquad\qquad\qquad\qquad\qquad\qquad\qquad\qquad\qquad\qquad\qquad\qquad\qquad\qquad\qquad\quad |$
$\qquad\qquad\qquad\qquad\qquad\qquad\qquad\qquad\qquad\qquad\qquad\qquad\qquad\qquad\qquad CH_3$ $CH_3-O-CH_2-CH_2-CH_2-O-CH_3$, $CH_3-O-CH-CH_2-OOCCH_3$,
$\qquad\qquad\qquad\qquad\qquad\qquad\qquad\qquad\qquad\qquad\qquad |$
$\qquad\qquad\qquad\qquad\qquad\qquad\qquad\qquad\qquad\qquad CH_3$ $CH_3COO-CH_2-CH-CH_2-OOCCH_3$, $CH_3O-CH_2-CH_2-OSO_3H$, $CH_2OH-CH_2-OPO_3H_2$,
$\qquad\qquad\qquad\qquad\qquad |$
$\qquad\qquad\qquad\qquad\qquad CH_3$ $CH_3-O-CH_2-CH_2-OSO_2O-CH_2-O-CH_3$, $CH_2Cl-CH_2-O-CH_3$,
$\qquad\qquad\qquad\qquad\qquad\qquad\qquad\qquad\qquad\qquad\qquad\qquad\qquad\qquad\qquad\quad OCH_3$
$\qquad\qquad\qquad\qquad\qquad\qquad\qquad\qquad\qquad\qquad\qquad\qquad\qquad\qquad\qquad\quad |$
$CH_2Cl-CH_2-OOCC_2H_5$, $CH_2OH-CHOH-CH_2-ONO_2$, $CH_3-O-CH_2-C-CH_2-O-CH_3$,
$\qquad\qquad\qquad\qquad\qquad\qquad\qquad\qquad\qquad\qquad\qquad\qquad\qquad\qquad\qquad\quad |$
$\qquad\qquad\qquad\qquad\qquad\qquad\qquad\qquad\qquad\qquad\qquad\qquad\qquad\qquad\qquad\quad CH_3$ $CH_3COO-COH-CH_2-OOCCH_3$, $CH_3-O-CH_2-COH-CH_2-OOCCH_3$,
$\qquad\qquad\quad |\qquad\qquad\qquad\qquad\qquad\qquad\qquad\qquad\qquad\qquad |$
$\qquad\qquad\quad CH_3\qquad\qquad\qquad\qquad\qquad\qquad\qquad\qquad\qquad CH_3$

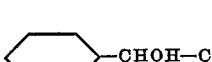

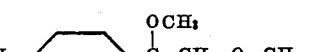

and the like as well as their homologues, analogues and suitable substitution products.

A second group of suitable compounds includes the cyclic as well as mixed cyclic and non-cyclic ethers and/or esters such as

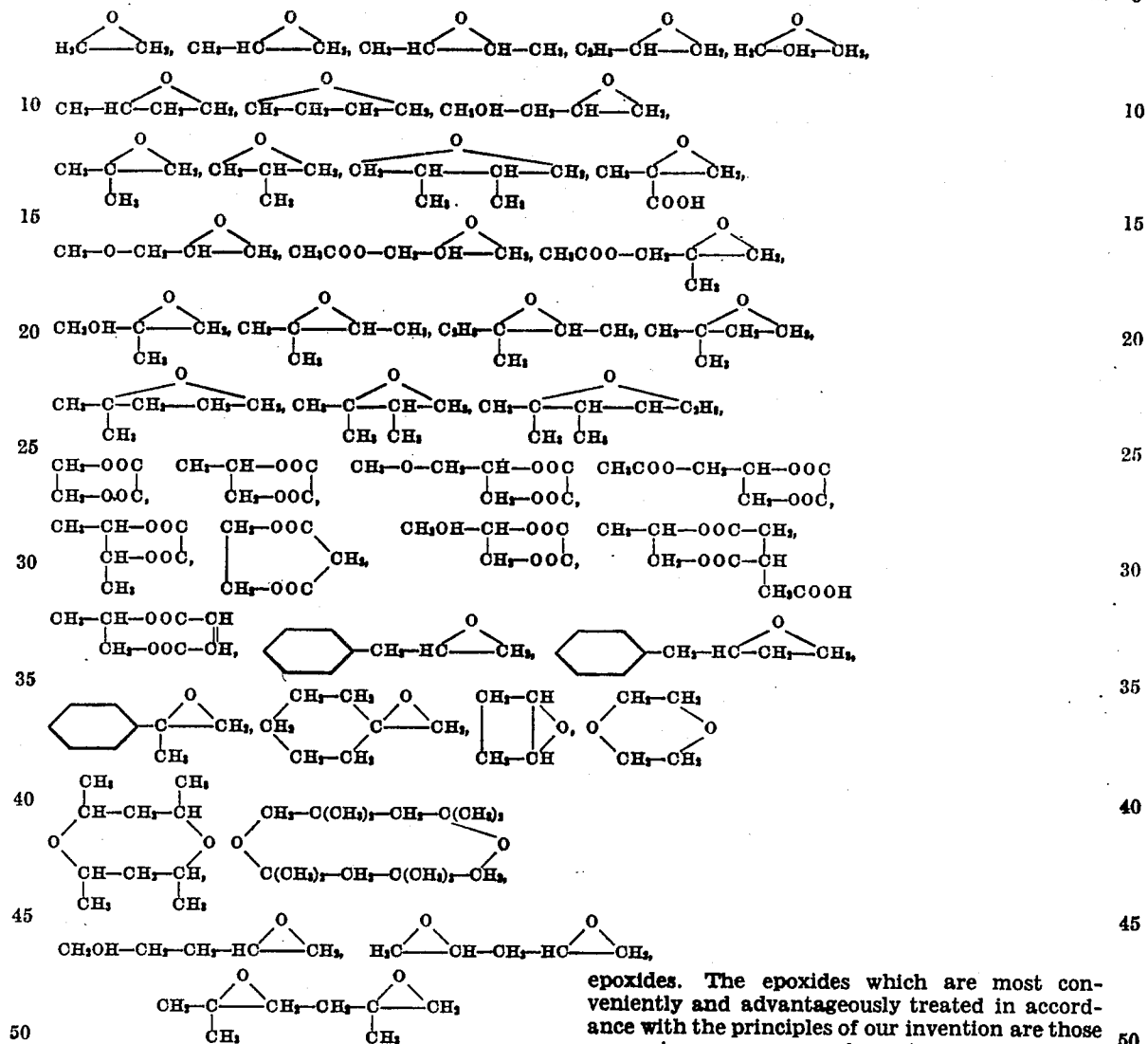

and the like and their homologues, analogues and suitable substitution products.

Suitable halogenated ethers and/or esters may be advantageously treated by our method. Suitable halogenated ethers and/or esters contain halogen atoms which are not linked to carbon atoms to which an ethereal oxygen atom, ester group or hydroxyl group is attached, and, in addition said halogen atoms must be embraced in a compound containing at least one ether group or ester radical other than halogen.

The contemplated ethers and/or esters may be of aliphatic, aralkyl, alicyclic or heterocyclic character. The ethereal oxygen atoms and ester radicals may be linked to carbon atoms of primary, secondary or tertiary character.

We are particularly concerned with the treatment of cyclic ethers of the class known as epoxides. The epoxides which are most conveniently and advantageously treated in accordance with the principles of our invention are those possessing an epoxy carbon atom linked to two vicinal aliphatic carbon atoms. Such epoxides will contain the group

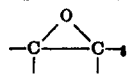

The loose bonds may be taken up by hydrogen and/or carbinol, alkyl, aralkyl, carbocyclic, heterocyclic groups and/or other suitable organic radicals which may or may not be further substituted, or the loose bonds may be taken up by any suitable substituent. The halogenated epoxides of this type such as

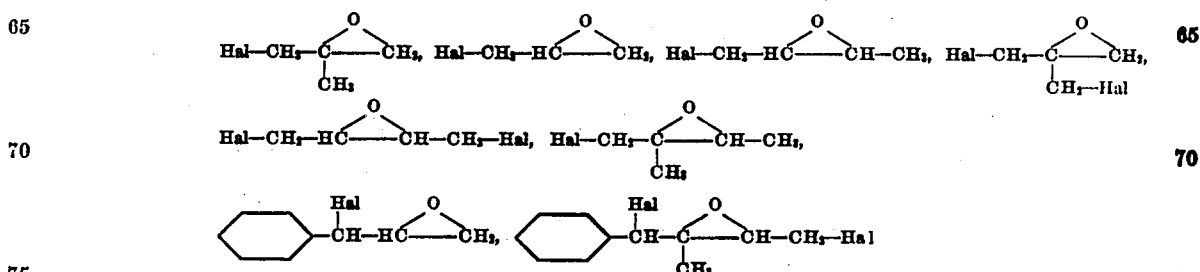

and the like and their homologues, analogues and suitable substitution products may be treated by our method and be readily converted to valuable hitherto difficultly obtainable unsaturated carbonylic compounds.

The main reaction products obtained in the execution of our invention are carbonylic compounds which may be saturated or unsaturated, depending on the number and location of ether, ester and/or hydroxyl groups contained in the compound treated. Ethers and/or esters of polyhydric alcohols containing at least three carbinol groups will usually be converted to unsaturated carbonylic compounds. If the polyhydric alcohol from which the treated compound may be considered as derived is dihydric, the carbonylic product is saturated. For example, ethers, esters and ether-esters of glycerol will yield unsaturated carbonylic compounds, while the ethers, esters and ether-esters of the glycols and polyglycols will usually yield saturated carbonylic compounds.

The mechanism of the reaction or reactions which occur when a suitable ether and/or ester is converted to an unsaturated carbonylic compound by our method is at present unknown and difficult of ascertainment. For purposes of clearness, two alternative mechanisms, which may be assumed to occur, will be presented, although it is to be understood that we do not intend to limit our invention to any specific mode or order of occurrence of the conversion or conversions effected in accordance with the principles of our invention as herein set forth.

When a suitable compound, for example, a halogenated epoxide, is converted to a carbonylic compound, by our method, the mechanism of the conversion may be represented by the specific reactions assumed to occur when glycerine epichlorhydrin is converted to acrolein. The primary reaction comprises hydration of the epoxy group and subsequent hydrolysis of the halogenated carbon atom in accordance with the equation:

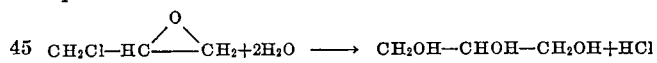
$CH_2Cl-HC-CH_2+2H_2O \longrightarrow CH_2OH-CHOH-CH_2OH+HCl$

Under the preferred conditions of operation and in the presence of the hydrogen halide liberated, the intermediately formed polyhydric alcohol, in this case glycerol, is probably converted to beta-hydroxy-propionaldehyde, which compound being unstable under the conditions of its formation may split off water to yield acrolein in accordance with the equations $CH_2OH-CHOH-CH_2OH \longrightarrow CH_2OH-CH_2-CHO+H_2O$ $CH_2OH-CH_2-CHO \longrightarrow CH_2=CH-CHO+H_2O$.

Regardless of the reaction mechanism assumed to occur, the desired advantageous results are attained if the invention is executed in the presence of water and an acid or acid-acting substance at a temperature and at a pressure at which at least a major portion of the polyhydric alcohol formed by hydration and/or hydrolysis of the compound treated would be unstable.

We have found that those contemplated compounds possessing a tertiary carbinol group, halogenated tertiary carbon atom or a tertiary carbon atom linked to an ethereal oxygen or ester group are particularly adaptable to treatment by our method. Such compounds are readily and substantially completely converted to valuable carbonylic compounds containing a tertiary carbon atom.

The carbonylic reaction products obtained may be aldehydic, ketonic or of mixed aldehydic and ketonic character depending on the relative position and on the character of the carbon atoms to which halogen atoms, hydroxyl groups, ester groups and/or ether groups of the treated compound are attached. In most cases, when the compound treated possesses a primary carbon atom linked to a halogen atom, hydroxyl group, ethereal oxygen or ester group, the reaction product is aldehydic. However, in some cases, when the treated compound possesses such a primary carbon atom linkage, ketones are formed through a mechanism which is not quite understood. The reaction product in these cases is a mixture of ketone and aldehyde containing usually a larger amount of ketone than aldehyde. For example, the compound

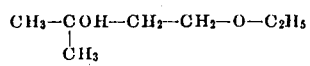
$CH_3-COH-CH_2-CH_2-O-C_2H_5$
$\phantom{CH_3-C}|$
$\phantom{CH_3-C}CH_3$ when treated according to our method yielded a mixture of carbonylic compounds containing about 72% methyl isopropyl ketone and 28% of the expected aldehyde. When the treated compound possesses only secondary and/or tertiary carbon atoms linked to a halogen atom, hydroxyl group, ethereal oxygen atom and/or ester group, the product is usually ketonic in character. However, in certain cases, mixtures of ketones and aldehydes are formed. For example, we have found that the epoxide

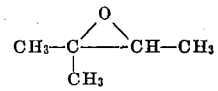
$CH_3-C-CH-CH_3$ (with O bridge)
$\phantom{CH_3-}|$
$\phantom{CH_3-}CH_3$ when treated in accordance with our invention yields a mixture of about 90% methyl isopropyl ketone together with about 10% of a valeraldehyde of not yet identified structure.

In the majority of cases when a suitable inorganic ester or ether-ester is treated by our method, it is not necessary that an extraneous acid or acid-acting compound be applied. Under the preferred conditions of execution of the invention, said compound containing an inorganic acid radical, particularly a strong mineral acid radical, is in the presence of water hydrolyzed whereby the corresponding inorganic acid is liberated. For example, the treatment of $CH_2OH-CH_2OSO_3H$ will result in the formation of acetaldehyde and $H_2SO_4$, while a compound such as

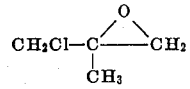
$CH_2Cl-C-CH_2$ (with O bridge)
$\phantom{CH_2Cl-}|$
$\phantom{CH_2Cl-}CH_3$ will be hydrated and hydrolyzed to yield methyl acrolein and HCl. We have found that the presence of an acid in amounts exceeding the optimum necessary to effect the reaction is detrimental in that undesirable side reactions resulting in the formation of polymerization and condensation products may occur. To obviate the occurrence of undesirable side reactions, we prefer to effect the conversion in the presence of relatively dilute aqueous acid solution. Any suitable means may be resorted to for keeping the acid concentration of the reaction mixture at or below a certain predetermined maximum. We may continuously or intermittently withdraw a portion of the aqueous acid solution from the system and admit an amount of water sufficient to maintain the acid concentration therein substantially constant. Another suitable method comprises neutralization of the acid formed in excess of the approximate amount needed to effect the desired conversion. This object may be achieved by the intermittent or continuous introduction of a suitable basic or basic-reacting agent. A particularly suitable and preferred mode of execution employing this principle comprises conducting the conversion in the presence of a metal carbonate, particularly an excess of an alkaline earth metal carbonate. For example we may effect the conversion in the presence of an excess of $CaCO_3$. Although $CaCO_3$ acts as a basic neutralizing agent for the liberated mineral acid, the reaction nevertheless proceeds under acid conditions as hereinafter described. The alkaline earth metal carbonates being insoluble in water act as neutralizing agents only as fast as they can be dissolved by the reaction:

This reaction occurs only on the surface of the solid $CaCO_3$, hence, the liquid between the solid particles obviously will be acid due to the acid continuously liberated as the hydrolysis reaction proceeds. In addition, if the process is executed in a closed system under pressure, the liberated $CO_2$ will dissolve in the reaction mixture and aid in keeping the mixture acidic. This mode of procedure may be particularly advantageous when it is desired to operate at relatively low temperatures and high pressures.

In those cases where the addition of an extraneous acid or acid-acting compound is necessary or desirable in order that the conversion may be effected under acid conditions at the desired rate, we may add a suitable acid, acidic salt, acid-reacting compound or a suitable agent capable of acting as an acid under the conditions of operation. A group of suitable acids includes the strong mineral acids such as $H_2SO_4$, $H_3PO_4$, $H_2S_2O_7$, $HPO_3$, $H_3PO_3$, $HCl$, $HBr$, $H_4P_2O_7$, $HClO_3$, $HClO_4$, $HNO_3$, and the like. Compounds such as $SO_2Cl_2$, $SOCl_2$, $SOBr_2$, $NOCl$, $POCl_3$, $PCl_3$, $PBr_3$, and the like, which may form acids in the presence of water, are also suitable. We may employ suitable inorganic acid-acting salts such as $ZnSO_4$, $ZnCl_2$, $FeCl_3$, $AlCl_3$, $CoCl_2$, $NiCl_2$, $Fe_2(SO_4)_3$, $Al_2(SO_4)_3$, $NaHSO_4$, $NaH_2PO_4$ and the like. In addition, we may also employ organic salts and compounds capable of acting as mineral acids under the conditions of operation such as benzene sulphonic acid and its homologues and analogues, dialkyl and alkyl acid sulphates, alkylated phosphoric and sulphonic acids, halogenated organic acids, acids such as sulpho-acetic, etc., acid halides and compounds such as aniline hydrochloride and the like.

In general, the conversion power of the catalyst employed is dependent on its acid strength in aqueous solution and upon the temperature of execution of the process. The weaker the acidity of the conversion agent, the lower is its conversion power at any given temperature. Accordingly, other conditions being the same, the use of a weaker conversion agent ordinarily requires its application in higher concentrations and/or higher operating temperatures are necessary to obtain the same degree of conversion activity. In the majority of cases, when the use of a conversion agent must be resorted to, we prefer to employ sulphuric acid. Sulphuric acid may be advantageously employed in aqueous solutions having concentrations in the range of from about 3% to 20% $H_2SO_4$. Higher acid concentrations may be used when it is desired to accelerate the reaction, but ordinarily when $H_2SO_4$ is employed in concentrations exceeding about 20% $H_2SO_4$, there is a decrease in the yield of the carbonylic reaction product due to the formation of tar and other polymerization and condensation products.

The present invention may be executed in a wide variety of suitable manners depending on the specific ether and/or ester to be treated, on the acid or acid-acting agent employed and on the particular operating conditions chosen. In a preferred mode of operation, we contact the compound to be treated with water or with an aqueous solution of an acid or acid-acting compound in a suitable reaction vessel preferably equipped with mechanical or other stirring means and means for heating and/or cooling its contents. We prefer to operate with the water or dilute aqueous acid solution in substantial excess of the compound treated, hence we may advantageously introduce the ether and/or ester intermittently or continuously to the heated or cooled and agitated water or aqueous acid solution.

The conversion may be accompanied by the occurrence of undesirable side reactions as polymerization and condensation occasioned by prolonged contact of the carbonylic compounds with the acid reaction mixture. To prevent the occurrence of these undesirable side reactions, we prefer to operate in such a manner that the carbonylic reaction product may be removed from the reaction mixture substantially as soon as it is formed therein. This object may be achieved in a wide variety of ways. We may employ a suitable reaction vessel in communication with a distilling or fractionating apparatus, and effect the rapid removal of the carbonylic reaction product by distilling it or its azeotropic mixture or mixtures from the reaction vessel. In the great majority of cases, the boiling temperature of the carbonylic compound or its azeotropic mixtures comprising any of the constituents of the reaction mixture is lower than the boiling temperature of the reaction mixture, hence by controlling the pressure on the system and/or the reflux ratio of the distilling column, we may remove the carbonylic reaction product therefrom at any desired rate.

When the object of our invention is the preparation of unsaturated carbonylic compounds, a suitable ether and/or ester is preferably treated with water under acid conditions at a temperature preferably above 100° C. and at a superatmospheric pressure. The unsaturated carbonylic compounds are preferably distilled from the reaction mixture substantially as soon as they are formed therein. It is, in many cases, desirable to operate in such a manner that an amount of water in excess of the carbonylic compound be distilled from the reaction mixture with the latter. By resorting to this expedient, the carbonylic compound may be removed at a rate prohibitive to the occurrence of side reactions.

In order to maintain the acid concentration and volume of water in the reaction vessel substantially constant, we may continuously or intermittently admit an amount of water equivalent in volume to that removed by distillation. In many cases, it is desirable to intermittently or continuously admit aqueous solutions, mixtures or suspensions of the ether and/or ester to the reaction vessel. The compound to be treated and/or water or aqueous acidic solution may be fed into any desired portion of the reaction vessel by any suitable means. For example, the gaseous or liquid ether and/or ester may be forced into the reaction vessel through a porous disc, a perforated tube or similar device. Agitation of the reactants is generally useful since it materially enhances the rate of solution and/or dispersion of the introduced reactant in the reaction vessel and more intimate contact of the reactants is thereby effected.

The ethers of non-cyclic character will, in addition to the corresponding carbonylic reaction product, yield an alcohol which may or may not be inert under the conditions of execution of the invention. For example, the compound $$CH_2OH—CH_2—O—C_2H_5$$

will form acetaldehyde and ethyl alcohol in accordance with the equations $$CH_2OH—CH_2—O—C_2H_5+2H_2O \rightarrow CH_2OH—CH_2OH+C_2H_5OH$$

$$CH_2OH—CH_2OH \rightarrow CH_3—CHO+H_2O$$

Similarly, an ester, whether of cyclic or non-cyclic character, will on treatment yield the corresponding carbonylic compound and acid. Mixed ethers and esters will yield in addition to carbonylic compounds, the corresponding monohydric alcohols and acid as well as esters resulting therefrom. These non-carbonylic compounds may be recovered from the reaction mixture in any suitable manner. In many cases, they may be distilled from the reaction mixture with the carbonylic compound.

The carbonylic reaction products may in most cases, when distillation methods of removal are resorted to, be recovered by condensing the vapors removed from the reaction vessel. The condensate which comprises the carbonylic reaction product, and may comprise water and/or any other volatile constituent of the reaction mixture, may, if desired, be used as such or the carbonylic compound as well as other valuable substituents may be separated therefrom by any suitable means or combinations of means such as stratification, extraction, distillation, use of salting out and drying agents, etc.

In the majority of cases, our invention is best executed in a preferred temperature range of from about 100° C. to 250° C. In some cases, lower temperatures may be advantageously employed. Higher temperatures and higher pressures may be used when it is desired to accelerate the reaction. Ordinarily, when temperatures above about 100° C. are employed, the invention is executed under superatmospheric pressures, but when operating at lower temperatures, atmospheric as well as subatmospheric pressures may be used.

The following examples are introduced for the purpose of illustrating the mode of operation and the particular product or products obtained when specific ethers and/or esters are treated by our method.

*Example I*

500 c. c. of a 12% aqueous $H_2SO_4$ solution were placed in a suitable reaction vessel provided with a stirrer and means for removing the reaction product by fractionation with the system under a superatmospheric pressure. The $H_2SO_4$ solution was heated to about 150° C. under the existing pressure. The heated acid solution was stirred and a total of 100 gm. (2.27 mols.) of ethylene oxide were slowly introduced into the reaction vessel at a zone below the surface of the solution therein.

The reaction product, with an excess of water, was distilled from the system at approximately the same rate at which the ethylene oxide was admitted.

The condensed distillate was stratified. The non-aqueous layer was separated, dried and fractionated. Acetaldehyde was obtained in a yield of about 91%.

*Example II*

700 c. c. of a 10% aqueous $H_2SO_4$ solution were placed in a suitable reaction vessel and heated to a temperature of about 140° C. under the existing pressure. The heated solution was stirred while 176 gm. (2.0 mols.) of dioxane

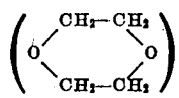

were introduced below the level of the reaction mixture.

Acetaldehyde along with an excess of water were distilled from the system substantially as fast as it was formed therein.

154.9 gm. (3.52 mols.) of acetaldehyde were recovered from the condensed distillate. This represents a yield of 88% calculated on the dioxane applied.

*Example III*

About 2000 c. c. of an aqueous 12% $H_2SO_4$ solution were charged to the kettle of a pressure fractionating apparatus. The acid solution was stirred while 400 gm. (5.5 mols.) of isobutylene oxide

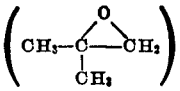

were introduced. The mixture was heated to a temperature of about 120° C. The reaction product and water were removed from the still-head at such a rate that the still-head temperature was maintained at a temperature about 10° C. below the kettle temperature. Sufficient water was continuously introduced into the system to keep the acid concentration therein substantially constant.

The condensed distillate was allowed to stratify. The non-aqueous liquid phase was separated, dried and fractionated.

320 gm. (4.45 mols.) of isobutyraldehyde were obtained. The yield of isobutyraldehyde was about 82% of the theoretical.

*Example IV*

500 c. c. of a 15% aqueous $H_3PO_4$ solution were mixed with 206 gm. (2.0 mols.) of the hydroxy ether of the formula

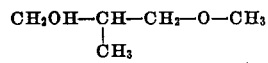

The mixture was charged to a pressure fractionating apparatus and treated at a temperature of 153° C. and a pressure of about 75 lbs./sq. in. (gauge).

The reaction product, along with water and methyl alcohol, was distilled from the system at about the same rate at which it was formed therein.

The condensed distillate was allowed to stratify. The upper layer (non-aqueous) was dried and fractionated. Isobutyraldehyde was obtained in a yield of about 85%. Methyl alcohol was recovered from the aqueous layer.

Example V 350 gm. (3.78 mols.) of epichlorhydrin

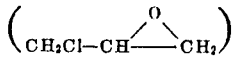

were mixed with about 2000 c. c. of water and the mixture charged to the kettle of a pressure still. 210 gm. (2.1 mols.) of $CaCO_3$ were added and the mixture was stirred and heated at about 200° C. The reaction product, along with an excess of water, was distilled from the system at about the same rate at which the conversion occurred. Water was intermittently added to keep the volume of the reaction mixture substantially constant.

The condensed distillate was fractionated. Acrolein was obtained in a yield of about 60% calculated on the epichlorhydrin applied.

Example VI 500 c. c. of an aqueous 10% $H_2SO_4$ solution were mixed with 266 gm. (2.0 mols.) of the oxalix acid ester of propylene glycol of the formula

The mixture was charged to the kettle of a suitable pressure fractionating still and heated at a temperature of about 160° C. under the pressure in the system.

The reaction product and water were distilled from the system at a rate sufficiently high to prevent the accumulation of the former in the system.

The condensed distillate was fractionated. A mixture of propionaldehyde and acetone was obtained. The propionaldehyde was obtained in a yield of about 80%.

Example VII 500 gm. (4.7 mols.) of methyl epichlorhydrin

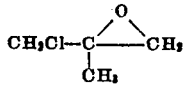

3 liters of water and 260 gm. (2.6 mols.) of $CaCO_3$ were placed in the kettle of a pressure still and stirred and heated at a temperature of about 150° C.

The reaction product and a large excess of water were distilled from the system with the still-head at a temperature about 10° C. below that of the reaction mixture.

The condensed distillate was allowed to stratify and the liquid phases were separated. The non-aqueous phase was dried with $Na_2SO_4$ and fractionated.

Methyl acrolein

was obtained in a yield of about 75%.

Example VIII 500 gm. (6.75 mols.) of glycidol

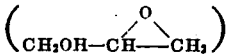

were dissolved in about 3 liters of water. This solution was fed, at a rate of about 500 c. c. per hour, into the kettle of a pressure still containing about 2000 c. c. of an 8% $H_2SO_4$ solution. The mixture in the kettle was kept at a temperature of about 210° C. An acrolein water mixture was distilled from the reaction vessel at about the same rate at which the aqueous glycidol solution was admitted.

The distillation was continued until no more acrolein could be detected in the distillate.

The condensed distillate was fractionated. Acrolein was obtained in a yield of about 50%.

Example IX 500 gm. (5.8 mols.) of 2-methyl-2,3-epoxy-butane

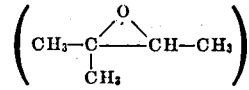

was slowly added to about 2000 c. c. of an aqueous 15% $H_3PO_4$ solution contained in the kettle of a pressure still equipped with a mechanical stirrer. The contents of the reaction vessel were stirred and heated to a temperature of about 125° C. A mixture of a carbonylic compound and water was distilled from the system under the existing pressure at such a rate that the still-head temperature was kept about 10° C. below the kettle temperature. Water was admitted to the kettle to keep the acid concentration therein about constant. The operation was continued until no more carbonylic compound would be detected in the condensed distillate.

The condensed distillate was allowed to stratify and the liquid phases were separated. The non-aqueous phase was dried and fractionated.

The main reaction product was methyl isopropyl ketone

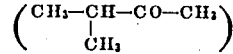

which was obtained in a mixture containing about 90% of the ketone and about 10% of a valeraldehyde of unidentified structure. The methyl isopropyl ketone was obtained in a yield of about 86%.

Example X 500 gm. (4.15 mols.) of 2-chloro-3,4-epoxy-pentane

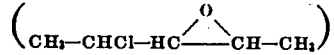

3 liters of water and 230 gm. (2.3 mols.) of $CaCO_3$ were placed in a pressure still and the mixture was stirred and heated at a temperature of about 200° C. in a closed system.

The mixture was stirred and heated for about two hours. At the end of this time the reaction mixture was cooled and discharged from the system. The mixture was then fractionated. The carbonylic reaction product was distilled over as an azeotrope with water. The condensed distillate was allowed to stratify. The non-aqueous layer was dried and refractionated.

The main reaction product was the unsaturated ketone of the formula

This unsaturated ketone boils at a temperature of about 122° C. at atmospheric pressure.

The product was obtained in a yield of 65% calculated on the epoxide applied.

Example XI 500 c. c. of a 12% aqueous solution of $H_2SO_4$ were placed in a suitable reaction vessel equipped with a mechanical stirrer and a suitable pressure fractionating column. The $H_2SO_4$ solution was heated and stirred while a total of 100 gm. (1.16 mols.) of 2-methyl-2,4-epoxybutane

were introduced slowly into the reaction vessel at a zone below the surface of the reaction mixture.

The reaction product was distilled from the system at approximately the same rate at which the cyclic ether was added.

The condensed distillate was stratified; the non-aqueous layer was dried and fractionated. The main reaction product was isovaleraldehyde, which compound was obtained in a yield of about 85%.

It will be apparent to those skilled in the art to which our invention pertains that the same may be executed in a batch, intermittent or continuous manner. The compound to be treated may be continuously introduced into the reaction vessel, or the compound to be treated may be continuously introduced into the reaction vessel in solution or suspension with water or other inert compounds. The reaction product per se or as an azeotrope may be continuously distilled from the system. The distillate may be condensed and conducted to a communicating apparatus wherein it may be rectified and the product or products obtained in the desired degree of purity. Other than distillation means may be resorted to for effecting rapid removal of the carbonylic product from the acidic reaction mixture. For example, the ether and/or ester may be contacted with water or an aqueous acid solution in a reaction tube heated to the desired temperature. The partially or completely reacted mixture may then be conducted to a recovery stage and therein contacted with a substance capable of reacting with the carbonylic reaction product to form a compound which is preferably insoluble in the reaction mixture. The insoluble compound may be separated from the reaction mixture and the latter conducted to a reaction stage. The ether and/or ester may be admitted to the system at any desired zone or zones at substantially the same rate at which it is converted.

When an epoxide is treated with an aqueous acid solution, the reactants are preferably contacted in the reaction vessel. With the more stable ethers and/or esters, the acid solution and compound to be treated may be contacted before, during or after their introduction into the reaction vessel.

The carbonylic products obtained may be used as resin forming bodies per se or they may be converted to resins and other condensation products by utilization of a suitable known agent for this purpose. In many cases, the products or mixtures of the same may be used for solvent and extraction purposes and as intermediates in the preparation of many useful organic chemicals. For example, they may be utilized to introduce alkyl or alkenyl groups into organic compounds by condensation or by the use of organo metallo derivatives. The unsaturated aldehydes and ketones may be oxidized to the corresponding acids and have varied uses in pharmaceutical chemistry.

While we have in the foregoing described in some detail the preferred embodiments of our invention and some variants thereof, it will be understood that this is only for the purpose of making the invention more clear and that the invention is not to be regarded as limited to the details of operation herein described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as possible in view of the prior art.

We claim as our invention:

1. A process for the production of valuable carbonylic compounds which comprises heating a halogenated epoxide with water under acid conditions and a pressure substantially greater than atmospheric to a temperature at least equal to 100° C., whereby the halogenated epoxide is converted to a compound of the class consisting of aldehydes and ketones, and removing the resulting carbonylic compound from the reaction mixture substantially as soon as it is formed therein.

2. A process for the production of valuable carbonylic compounds which comprises heating an hydroxy-epoxide with water in the presence of a mineral acid-acting compound under a pressure substantially greater than atmospheric to a temperature at least equal to 100° C., whereby the epoxide is converted to a compound of the class consisting of aldehydes and ketones, and removing the resulting carbonylic compound from the reaction mixture substantially as soon as it is formed therein.

3. A process for the production of valuable carbonylic compounds which comprises heating an epoxide wherein an epoxy oxygen atom is linked to two vicinal carbon atoms, with water in the presence of a mineral acid-acting compound under a pressure substantially greater than atmospheric to a temperature of from about 100° C. to about 250° C., whereby the epoxide is converted to a compound of the class consisting of aldehydes and ketones, and removing the resulting carbonylic compound from the reaction mixture substantially as soon as it is formed therein.

4. A process for the production of valuable carbonylic compounds which comprises heating an epoxide containing a tertiary carbon atom and wherein an epoxy oxygen atom is linked to two vicinal carbon atoms, with water in the presence of a mineral acid-acting compound under a pressure substantially greater than atmospheric to a temperature of from about 100° C. to about 250° C., whereby the epoxide is converted to a compound of the class consisting of aldehydes and ketones, and removing the resulting carbonylic compound from the reaction mixture substantially as soon as it is formed therein.

5. A process for the production of valuable carbonylic compounds which comprises heating an epoxide wherein an epoxy oxygen atom is linked to two vicinal carbon atoms with a dilute aqueous solution of sulphuric acid under a pressure substantially greater than atmospheric at a temperature of from about 100° C. to about 250° C., whereby the epoxide is converted to a compound of the class consisting of aldehydes and ketones, and distilling the resulting carbonylic compound from the reaction mixture substantially as soon as it is formed therein.

6. A process for the production of valuable carbonylic compounds which comprises heating a halogenated epoxide wherein an epoxy oxygen atom is linked to two vicinal carbon atoms with water under acid conditions in the presence of a metal carbonate under a pressure substantially greater than atmospheric and at a temperature greater than about 100° C. at which the halogenated epoxide is converted to a compound of the class consisting of aldehydes and ketones at a practical rate, and removing the resulting carbonylic compound from the reaction mixture substantially as soon as it is formed therein.

7. A process for the production of valuable carbonylic compounds which comprises heating a halogenated epoxide with water under acid conditions in the presence of a metal carbonate under a pressure substantially greater than atmospheric and at a temperature greater than about 100° C. at which the halogenated epoxide is converted to a compound of the class consisting of aldehydes and ketones at a practical rate, and removing the resulting carbonylic compound from the reaction mixture substantially as soon as it is formed therein.

8. A process for the production of valuable carbonylic compounds which comprises heating a halogenated epoxide wherein an epoxy oxygen atom is linked to two vicinal carbon atoms with water under acid conditions in the presence of an alkaline earth metal carbonate under a pressure substantially greater than atmospheric and at a temperature greater than about 100° C. at which the halogenated epoxide is converted to a compound of the class consisting of aldehydes and ketones at a practical rate, and removing the resulting carbonylic compound from the reaction mixture substantially as soon as it is formed therein.

9. A process for the production of valuable carbonylic compounds which comprises heating a halogenated epoxide wherein an epoxy oxygen atom is linked to two vicinal carbon atoms with water in the presence of an excess of $CaCO_3$ under maintained acid conditions and a pressure substantially greater than atmospheric to a temperature of from about 100° C. to about 250° C., whereby the halogenated epoxide is converted to a compound of the class consisting of aldehydes and ketones, and distilling the resulting carbonylic compound from the reaction mixture substantially as soon as it is formed therein.

10. A process for the production of acrolein which comprises heating a glycerine epichlorhydrin with water under acid conditions at a temperature of from about 100° C. to about 250° C. and under a pressure substantially greater than atmospheric, whereby the epichlorhydrin is converted to acrolein, and distilling the acrolein from the reaction mixture substantially as soon as it is formed therein.

11. A process for the production of methyl acrolein which comprises heating methyl glycerine epichlorhydrin with water under acid conditions at a temperature of from about 100° C. to about 250° C. and under a pressure substantially greater than atmospheric, whereby the methyl glycerine epichlorhydrin is converted to methyl acrolein, and distilling the methyl acrolein from the reaction mixture substantially as soon as it is formed therein.

12. A process for the production of valuable carbonylic compounds which comprises heating a compound of the class consisting of the ethers, aliphatic carboxylic acid esters and mixed ether-aliphatic carboxylic acid esters of polyhydric alcohols with water in the presence of a concentration of a mineral acid-acting compound sufficiently high to convert the polyhydric alcohol derivative to a carbonylic compound of the class consisting of aldehydes and ketones under the conditions of operation but below the concentration at which substantial destruction of the carbonylic compound occurs, the process being executed at a temperature of from about 100° C. to about 250° C. and under a pressure substantially greater than atmospheric, while removing the resulting carbonylic compound from the reaction mixture during the operation.

13. A process for the production of valuable carbonylic compounds which comprises heating a compound of the class consisting of the ethers, aliphatic carboxylic acid esters and mixed ether-aliphatic carboxylic acid esters of polyhydric alcohols with an aqueous solution of a mineral acid of a concentration sufficiently high to convert the polyhydric alcohol derivative to a carbonylic compound of the class consisting of aldehydes and ketones under the conditions of operation but below the concentration at which substantial destruction of the carbonylic compound occurs, the process being executed at a temperature of from about 100° C. to about 250° C. and under a pressure substantially greater than atmospheric, while removing the resulting carbonylic compound from the reaction mixture substantially as soon as it is formed therein.

14. A process for the production of valuable carbonylic compounds which comprises heating a compound of the class consisting of the ethers, aliphatic carboxylic acid esters and mixed ether-aliphatic carboxylic acid esters of polyhydric alcohols with an aqueous acidic solution having an acid concentration at least equal to the acid concentration of a 3% aqueous sulphuric acid solution at a temperature of from about 100° C. to about 250° C., whereby the polyhydric alcohol derivative is converted to a carbonylic compound of the class consisting of aldehydes and ketones.

15. A process for the production of valuable carbonylic compounds which comprises heating a compound of the class consisting of the ethers, aliphatic carboxylic acid esters and mixed ether-aliphatic carboxylic acid esters of polyhydric alcohols with an aqueous solution of a mineral acid having an acid concentration in the range represented by the acid concentration of a 3% to 20% sulphuric acid solution at a temperature of from about 100° C. to about 250° C. and at a pressure substantially greater than atmospheric, while distilling the resulting carbonylic compound from the reaction mixture during the reaction.

16. A process for the production of valuable carbonylic compounds which comprises heating a compound of the class consisting of the ethers, aliphatic carboxylic acid esters and mixed ether-aliphatic carboxylic acid esters of polyhydric alcohols containing at least three carbinol groups with water in the presence of a concentration of a mineral acid-acting compound sufficiently high to convert the polyhydric alcohol derivative to a carbonylic compound of the class consisting of aldehydes and ketones under the conditions of operation but below the concentration at which substantial destruction of the carbonylic compound occurs, the process being executed at a temperature of from about 100° C. to about 250° C. and under a pressure substantially greater than atmospheric, while removing the resulting carbonylic compound from the reaction mixture during the operation.

17. A process for the production of valuable carbonylic compounds which comprises heating an ether of a polyhydric alcohol with water in the presence of a concentration of a mineral acid sufficiently high to convert the polyhydric alcohol ether to a carbonylic compound of the class consisting of aldehydes and ketones under the conditions of operation but below the concentration at which substantial destruction of the carbonylic compound occurs, the process being executed at a temperature of from about 100° C. to about 250° C. and under a pressure substantially greater than atmospheric, while distilling the carbonylic compound from the reaction mixture during the operation.

18. A process for the production of valuable carbonylic compounds which comprises heating an epoxide with an aqueous sulphuric acid solution having a concentration of from about 3% to about 20% $H_2SO_4$ at a temperature of from about 100° C. to about 250° C., while distilling the resulting carbonylic compound from the reaction mixture during the reaction.

19. A process for the production of isobutyraldehyde which comprises heating isobutylene oxide with an aqueous sulphuric acid solution having a concentration of from about 3% to about 20% $H_2SO_4$ at a temperature of from about 100° to about 250° C. and under a pressure substantially greater than atmospheric, while distilling the isobutyraldehyde from the reaction mixture substantially as soon as it is formed therein.

HERBERT P. A. GROLL.
GEORGE HEARNE.